Dec. 12, 1961  D. C. LORTZ ET AL  3,012,370
APPARATUS FOR POTTING PLANT SEEDS, SEEDLINGS AND THE LIKE
Filed June 20, 1960  4 Sheets-Sheet 1
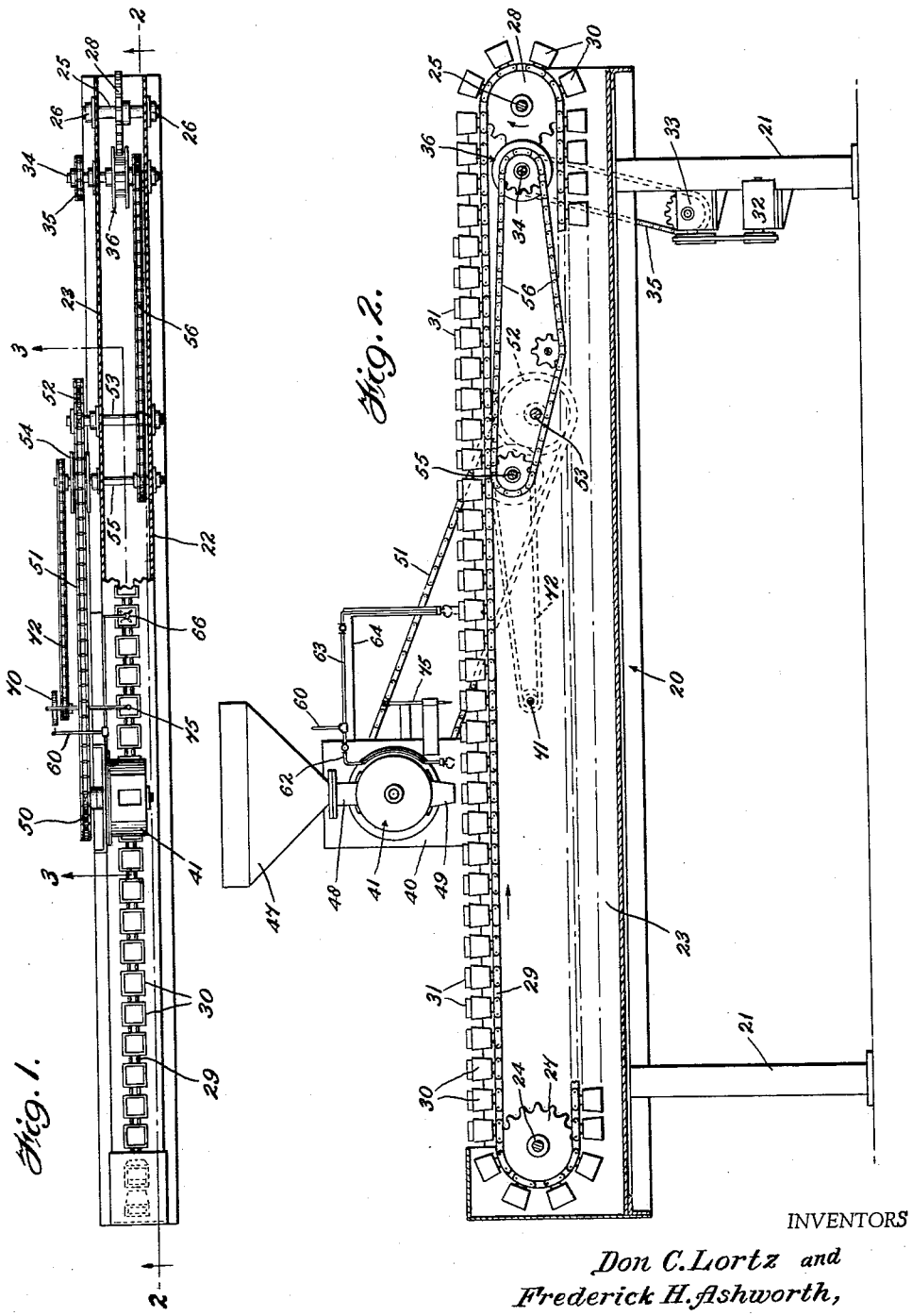
INVENTORS
*Don C. Lortz* and
*Frederick H. Ashworth,*
BY
ATTORNEY Dec. 12, 1961   D. C. LORTZ ET AL   3,012,370
APPARATUS FOR POTTING PLANT SEEDS, SEEDLINGS AND THE LIKE
Filed June 20, 1960   4 Sheets-Sheet 2

INVENTORS
*Don C. Lortz* and
*Frederick H. Ashworth,*
BY
ATTORNEY

Dec. 12, 1961  D. C. LORTZ ET AL  3,012,370
APPARATUS FOR POTTING PLANT SEEDS, SEEDLINGS AND THE LIKE
Filed June 20, 1960  4 Sheets-Sheet 3
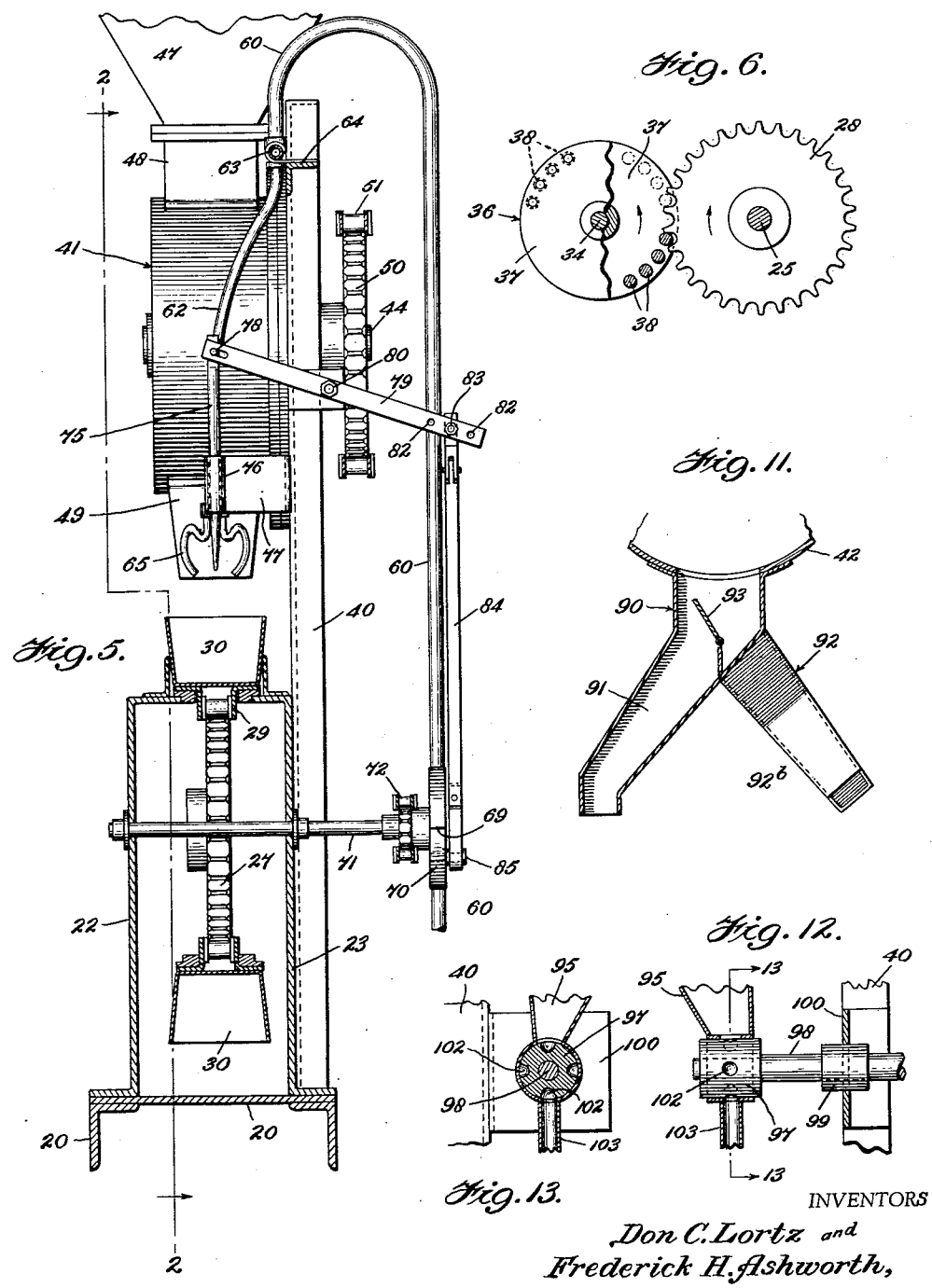
INVENTORS
Don C. Lortz and
Frederick H. Ashworth,
BY
*B.B.Collings*
ATTORNEY Dec. 12, 1961   D. C. LORTZ ET AL   3,012,370
APPARATUS FOR POTTING PLANT SEEDS, SEEDLINGS AND THE LIKE
Filed June 20, 1960   4 Sheets-Sheet 4
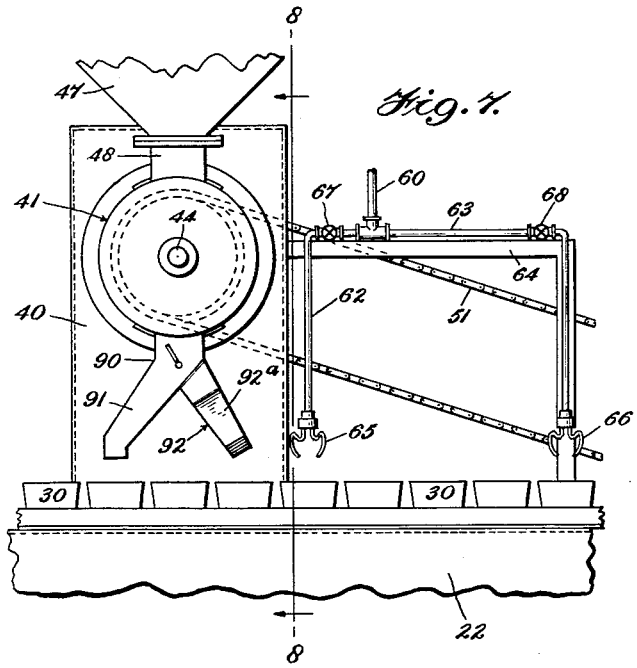
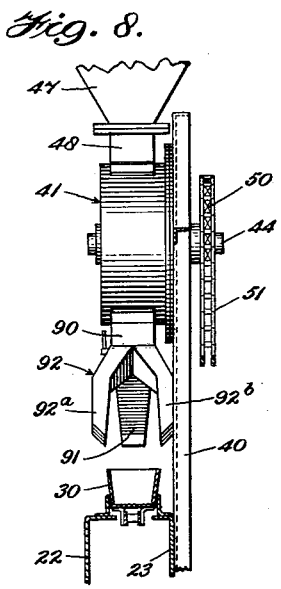
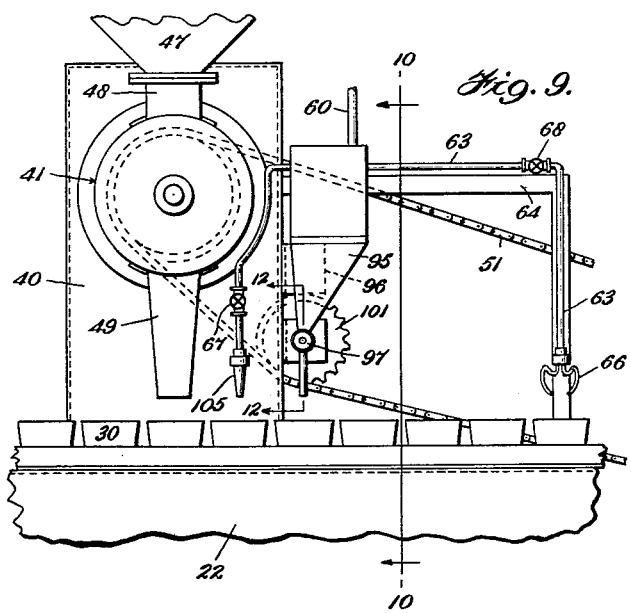
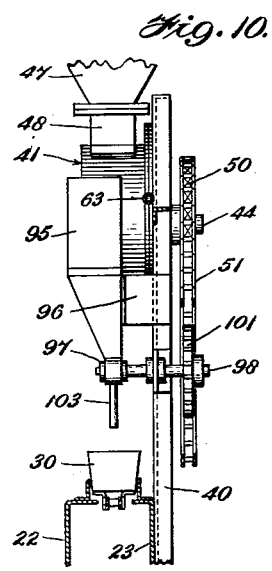
INVENTORS
*Don C. Lortz* and
*Frederick H. Ashworth,*
BY
*P. B. Collings*
ATTORNEY

United States Patent Office 3,012,370
Patented Dec. 12, 1961

3,012,370
APPARATUS FOR POTTING PLANT SEEDS, SEEDLINGS AND THE LIKE
Don C. Lortz and Frederick H. Ashworth, Idaho Falls, Idaho, assignors to Idaho Falls Steel Products Co., Idaho Falls, Idaho, a company of Idaho
Filed June 20, 1960, Ser. No. 37,448
13 Claims. (Cl. 47—1)

This invention relates to apparatus for potting plant seeds and seedlings, and has for its principal object the provision of mechanism of this character which will greatly facilitate the potting operations of commercial plant nurseries and greenhouses in which, because of the volume involved, potting is an item of considerable importance from the standpoint of both time and costs.

In such establishments it is now a common practice to place the seeds or seedlings in soil-filled pots constructed of peat-moss or analogous material which will disintegrate relatively rapidly upon being placed in the ground of the yard, garden or other site in which the plants are ultimately used, with the result that transplanting is unnecessary and the shock and/or other deleterious effects to which many species are susceptible if removed from the pots in which their growth is started are eliminated. While the present apparatus has been developed primarily for use in connection with such peat-moss pots, it is not necessarily limited thereto but may be employed or readily adapted for use in connection with pots constructed of other appropriate materials.

Briefly, the apparatus comprises a conveyor mechanism provided with a series of members adapted to receive and temporarily retain the peat-moss or other plant-receiving pots, which are serially moved to a plurality of positions or stations along the path of conveyor travel, at each of which an operation is performed contributing to the final production of potted plant elements. Such operations comprise, the deposit of a measured quantity of suitable soil into each pot, which deposit may be accomplished in either a single step or in a plurality of steps; the introduction of a plant seed or seedling into the soil so supplied to each pot; the watering of said soil before and/or after the plant introduction; and, in cases in which all of the soil is deposited at one time, a dibbling operation which provides a cavity in such soil for the reception of the plant element. The introduction of the plant elements may be accomplished manually, particularly in the case of delicate seedlings, but where seeds, especially those of the pelleted type, are being planted a mechanical seed feeder may be incorporated into the apparatus.

In the accompanying drawings constituting a part of this specification, in which like reference characters designate like parts throughout the views:

FIGURE 1 is a top plan view, partly broken away and in section, of one example of apparatus constructed in accordance with the invention, the soil-supply hopper being omitted for clearness;

FIG. 2 is a longitudinal sectional-elevational view of the mechanism shown in FIG. 1, on approximately the planes indicated by the lines 2—2 in FIGS. 1 and 5;

FIG. 5 is a still further enlarged transverse sectional view, on the plane indicated by the line 5—5 in FIG. 3, looking in the direction of the arrows;

FIG. 6 is a detail elevational view, partly broken away and in section, of one of the intermittent-drive devices employed in the apparatus;

FIG. 7 is a fragmentary front elevational view illustrating the apparatus when arranged to effect two-stage deposit of the soil into the pots;

FIG. 8 is a transverse sectional-elevational view thereof, on the plane indicated by the line 8—8 in FIG. 7, looking in the direction of the arrows;

FIG. 9 is a view similar to FIG. 7, showing the inclusion of a seed feeder, and an alternative means for providing a plant-receiving cavity in the soil;

FIG. 10 is a sectional-elevational view, on the plane indicated by the line 10—10 in FIG. 9;

FIG. 11 is an enlarged vertical sectional view of the bifurcated soil-discharge spout shown in FIGS. 7 and 8;

Figure 3:
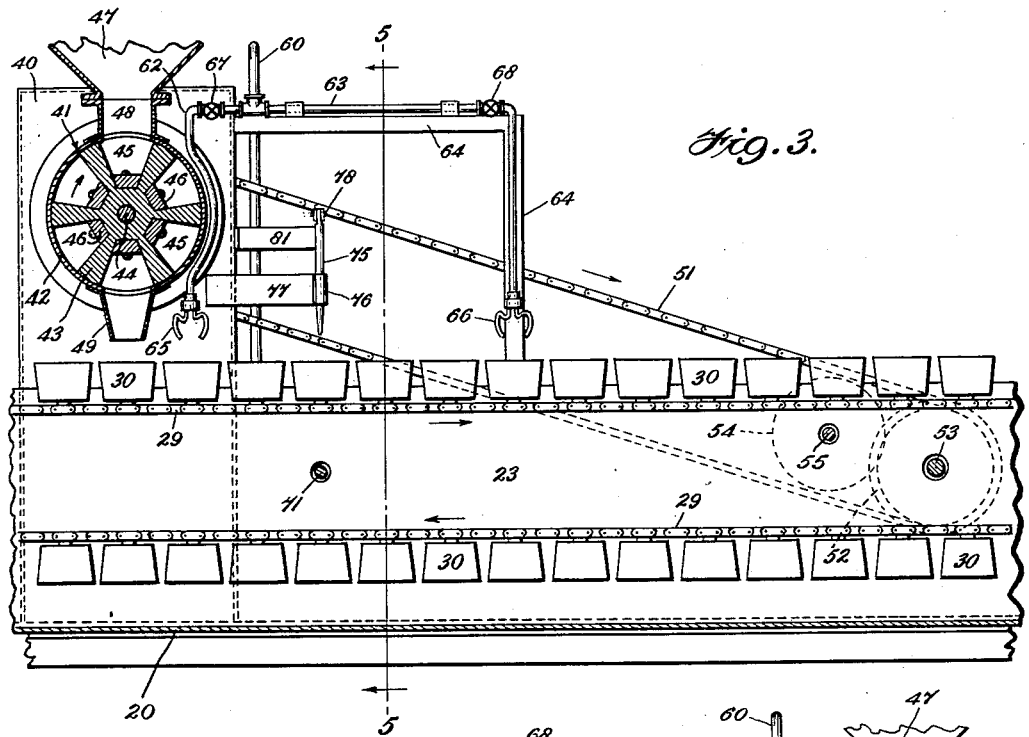
FIG. 3 is an enlarged sectional-elevational view of the mid portion of the apparatus, on the plane indicated by the line 3—3 in FIG. 1, looking in the direction of the arrows.

FIG. 12 is an enlarged detail sectional view of a portion of the seed-feeding device shown in FIGS. 9 and 10, on the plane indicated by the line 12—12 in FIG. 9; and FIG. 13 is a similar view on the plane indicated by the line 13—13 in FIG. 12.

As illustrated in FIGS. 1–6, the apparatus comprises a supporting structure 20 including legs 21, which structure is surmounted by a pair of transversely spaced, longitudinally extending frame members 22 and 23. Transversely disposed shafts 24 and 25 are journaled in bearings 26 mounted on the respective end portions of said frame members, which shafts carry sprockets 27 and 28 respectively, about which is trained an endless chain 29. A series of cup members 30 are attached to certain of the links of this chain, which cups are arranged to receive and temporarily hold the peat-moss or other plant-receiving pots 31 during travel of the conveyer chain along its upper run, as depicted in FIG. 2.

A motor 32, and a speed-reducing mechanism 33 driven thereby, are mounted on a leg 21 or other suitable portion of the base structure 20, and said speed-reducer drives a continuously operating transverse shaft 34 by means of a chain-and-sprocket drive 35. Said shaft 34 is mounted adjacent the conveyer shaft 25 and it carries a conveyer actuating elements 36 which is arranged to impart intermittent movement to the conveyer. The construction of the element 36 is best shown in FIGS. 1 and 6, from which it will be readily understood that said element comprises a pair of transversely spaced disks 37 carried by the shaft 34 and interconnected by two sets of diametrically opposed, circumferentially spaced pins or rods 38. The parts are so constructed and arranged that the two sets of pins of the continuously rotating element 36 alternately mesh with the teeth of the conveyer sprocket 28, thereby inducing a partial (in this instance, one-sixth) revolution of such sprocket during each such engagement. There thus is obtained a step-by-step movement of the conveyor and the cups and pots carried thereby, whereby the pots are serially advanced to successive positions along the path of travel of the upper run of the conveyer, at each of which positions an operation contributing to the ultimate object is performed. These operations comprise at least the filling of the pots with suitable soil, the introduction of the plant elements thereinto, and the watering of the soil, which operations preferably are performed simultaneously at the several stations, although they are serial as regards each individual pot.

A vertical panel 40 is rigidly secured to the rear frame member 23 and a soil-measuring valve 41 is mounted on the front face of such panel. As best shown in FIG. 3, this valve comprises a casing 42 housing a rotor 43, carried by a shaft 44 and having a plurality of soil-receiving and measuring pockets 45, the capacity of each of which may be varied in accordance with the size of the particular pots being used, by the attachment or removal of the separable bottom elements 46. The said valve casing is surmounted by a soil hopper or container 47 the outlet opening of which communicates with the inlet passage 48 of the valve, and said casing has a discharge spout 49 disposed above the line of pots 31 whereby to direct the batches of soil into the respective pots when they are moved into co-operative position beneath it.

Figure 4:
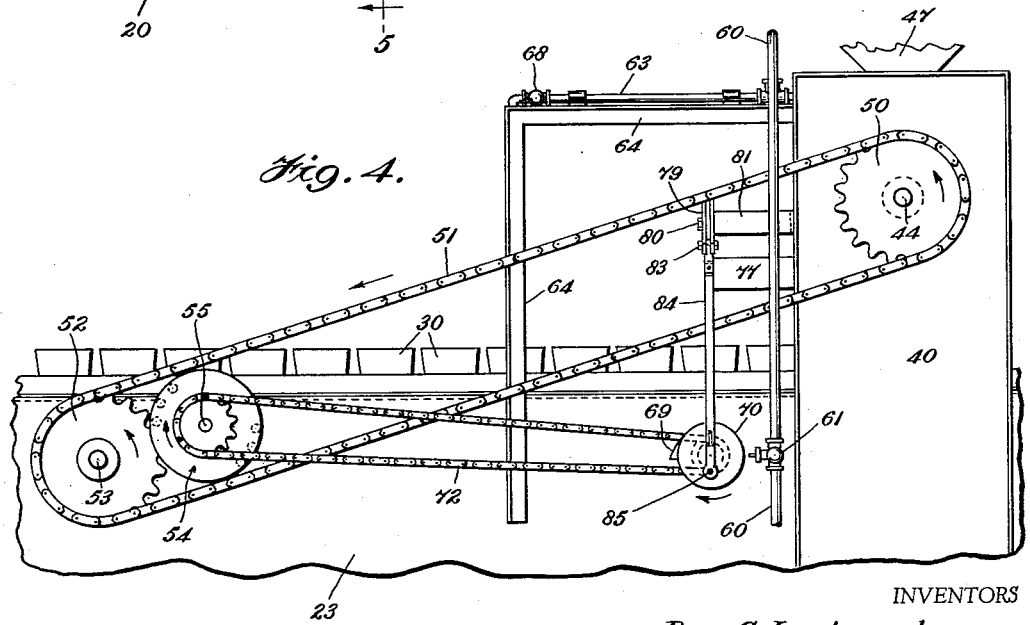
FIG. 4 is an elevational view of the same portion of the apparatus as illustrated in FIG. 3, but looking in the opposite direction.

The rotor 43 of the valve 41 is advanced step-by-step to bring the several pockets 45 successively into register with the inlet passage 48 where they are filled with soil from the container 47, and subsequently into register with the spout 49 through which their contents are discharged into the pots 31. As best shown in FIGS. 3 and 4, the said rotor movement is effected by means of a sprocket 50 mounted on the valve shaft 44 and driven by a chain 51 that is engaged with a sprocket 52 carried by a shaft 53 mounted by the main frame members 22 and 23. The sprocket 52 has associated with it an intermittent actuating element 54, of a construction similar to that of the element 36 described above, and mounted by a shaft 55 that is continuously driven by the shaft 34 by a chain-and-sprocket drive 56, best shown in FIGS. 1 and 2. The actuating elements 36 and 54 are so arranged and function that the valve rotor 43 is stationary while the cups and pots are being advanced by the conveyer under the action of the element 36, while the pots are stationary in substantially the positions shown in the several views when the valve rotor is advanced by the element 54 to discharge the soil from its pockets 45.

Beyond the soil-metering valve 41 (in the direction of movement of the upper run of the conveyer) means are provided for supplying water to the soil that has been deposited in the pots. As best shown in FIGS. 3, 4 and 5, such means comprise a pipe 60 connectible to any appropriate source of supply and having a normally closed control valve 61. At its upper end the said pipe is connected to branch pipes 62 and 63, supported by an auxiliary frame element 64 and terminating in spray heads 65 and 66 respectively, disposed above the line of pots 31 in longitudinally spaced relation, substantially as shown in FIG. 3. The said branch pipes 62 and 63 are respectively provided with the manually operable valves 67 and 68, whereby the flow to each head may be varied as required, and either of them cut off completely if desired.

The main water control valve 61 is biased to normally closed position and it is opened intermittently to effect discharge of determined quantities of water into the pots through the spray heads 65 and 66, by means of a cam 69 (FIGS. 4 and 5) carried by a disk 70 that is mounted on a shaft 71 which is continuously driven from the shaft 55 by means of a chain-and-sprocket drive 72.

The apparatus illustrated in FIGS. 1–5 is arranged to effect deposit of the required amount of soil into each pot in a single step, and contemplates the manual introduction of the plant elements thereinto. To assist in the latter, a dibble mechanism is provided at one of the positions temporarily assumed by the pots after they leave the spray head 65, which mechanism comprises a vertically disposed dibble member 75 slidably mounted in the barrel 76 of a bracket 77 that extends from the panel 40. As best shown in FIG. 5, the upper end of said dibble member is connected by means of a slidable pivotal connection 78 to one end of a rocker arm 79 that is pivotally mounted at 80 on a bracket 81 that likewise extends from the panel 40. The other end of said arm 79 is provided with a series of holes 82 for the selective reception of a pin or bolt 83 whereby the upper end of a connecting rod 84 may be pivotally connected thereto in various positions. The lower end of said rod 84 is journaled on a crank pin 85 carried by the disk 70 and thus, as said disk is rotated by the drive 72 it not only effects actuation of the water control valve 61 but also, through connecting rod 84, induces oscillation of the rocker arm 79 and reciprocation of the dibble member 75 into and out of the soil in a pot located beneath it, thereby producing a plant-receiving cavity in such soil. The watering of the soil by the spray head 65 previous to the dibbling assists in the maintenance of the cavity when the dibble is withdrawn; and the length of the dibble stroke may be varied as necessary or desired by varied location of the pivot pin 83 in one or another of the holes 82 in the rocker arm 79.

As above indicated, this form of the apparatus contemplates manual insertion of the seeds or seedlings into the pots, and this is effected at a position assumed by the latter upon leaving the dibbling position. Following this plant introduction, the pots move to a position beneath the spray head 66, the water from which tends to wash the soil over the seed, or around the seedling, and completes the potting. The pots ordinarily are supplied to the cups at the left hand end of the conveyer (as viewed in FIG. 2) and removed at the right hand end, by hand.

If two-stage deposit of the soil into the pots be desired, the valve 41 may be provided with a bifurcated discharge spout 90, as shown in FIGS. 7, 8 and 11. As will be readily understood therefrom, each batch of soil discharged from the valve rotor pockets 45 will be divided into two parts in said discharge spout, which will be separately directed to pots located at longitudinally spaced positions by the respective legs 91 and 92 of the spout. The proportions of the batch discharged through each of said legs may be varied by adjustment of a pivoted vane 93 located in the upper part of the spout. Introduction of the plant elements is effected when the pots are at a position between the two legs, and if said elements comprise seeds, the said legs may be of similar construction. Where seedlings are being planted the leg 92 preferably is itself divided into two legs $92^a$ and $92^b$, as clearly shown in FIG. 8, whereby to straddle the plants as they pass beneath it. When employing this mode of planting, dibbling is not necessary and therefore the dibble mechanism described above may be omitted, or if present may be rendered inoperative.

As previously mentioned, when seeds constitute the plant element, and especially if they be in pelleted form, a mechanical seed-feeder may advantageously be employed. One example thereof is illustrated in FIGS. 9, 10, 12 and 13 as comprising a hopper or container 95 supported by a bracket 96 extending from the frame panel 40, and which hopper is provided at its lower end with a rotatable plug 97 carried by a shaft 98 journaled in a bearing 99 mounted by a panel-carried bracket 100. The said shaft 98 is driven by means of a sprocket 101 engaged with the chain 51 that intermittently operates the soil-metering valve 41 and thus, with each movement of said chain, the shaft 98 and plug 97 are moved through a determined arc. The said plug is provided with a plurality of recesses or pockets 102, each preferably of a size to accommodate a single seed pellet and so circumferentially spaced that each arcuate movement of the plug 97 will bring a pellet-containing recess into register with the depending tube 103 through which the pellet will be directed into the pot. Obviously, this or a similar feeder may be incorporated into the constructions illustrated in FIGS 1–8 if desired.

FIG. 9 also shows an alternative means for producing a plant-receiving cavity in the soil in the pots. In lieu of the spray head 65 the branch water line 62 terminates in a jet nozzle 105 which directs the water from said branch line into the soil in a stream which has been found effective to produce the desired cavity. This permits of the omission of the mechanical dibble mechanism shown in FIGS. 1–5, although the shaft 71, disk 70, and cam 69 are retained for actuation of the water-control valve 61.

What is claimed is:

1. An apparatus for potting plant seeds and seedlings, comprising a conveyer mechanism having means arranged to receive and temporarily hold a series of plant-receiving pots; a soil container mounted adjacent said conveyer and having an outlet provided with a control valve, such valve having a discharge passage arranged to direct soil into the pots; means adjacent said soil-discharge means arranged to discharge water into the soil deposited in the pots prior to the introduction of the plant elements thereinto, such water-discharging means also having a control valve; driving means connected to said conveyer mechanism for effecting serial movement of the pots to and from co-operative positions relative to said soil-discharging and water-discharging means respectively; and means arranged to actuate said soil-control and water-control valves in timed relation to said pot movements, whereby to effect discharge of determined quantities of soil and water into the pots when they are in said co-operative positions.

2. An apparatus for potting plant seeds and seedlings, comprising a conveyer mechanism having means arranged to receive and temporarily hold a series of plant-receiving pots; a soil container mounted adjacent said conveyer and having an outlet provided with a control valve which is arranged to discharge soil into the pots when they are moved into co-operative relation thereto by the conveyer; means adjacent said conveyer arranged to discharge water into the pots, such water-discharging means also having a control valve; driving means connected to said conveyer mechanism for effecting serial movement of the pots to and from co-operative relation with said soil-discharging and water-discharging means respectively; means operable by said driving means to actuate said soil-control and water-control valve when the pots are in said co-operative relations, whereby to effect discharge of determined quantities of soil and water into the pots; and means controlled by said driving means, arranged to produce a cavity in the soil deposited in each pot, for receiving the plant element.

3. An apparatus for potting plant seeds and seedlings, comprising a conveyer mechanism having means arranged to receive and temporarily hold a series of plant-receiving pots; a soil container mounted adjacent said conveyer, having an outlet passage provided with a control valve disposed to discharge soil into the pots; means adjacent said conveyer arranged to discharge water into the pots, such water-discharging means also having a control valve; driving means connected to said conveyer mechanism arranged to induce intermittent serial movement of the pots to and from co-operative positions relative to said soil-discharging and said water-discharging means respectively; and means operable by said driving means arranged to actuate said soil-control and said water-control valves when the pots are stationary in said co-operative positions, whereby to effect discharge of determined quantities of soil and water into the pots.

4. Plant potting apparatus according to claim 1, wherein the water-discharging means is arranged to deliver water into the pots both prior and subsequent to the introduction of the plant elements thereinto.

5. Plant potting apparatus according to claim 1, wherein the discharge passage of the soil-control valve is bifurcated, with the legs thereof being arranged to discharge soil into the pots both prior and subsequent to the placement of the plant elements therein.

6. Plant potting apparatus according to claim 5, wherein the bifurcated soil-discharge passage is provided with means whereby the relative proportions of soil discharged through the respective legs may be varied.

7. Plant potting apparatus according to claim 2, wherein the cavity-producing means comprises a nozzle included in the water-discharging means, arranged to direct a jet of water into the soil in the pots, such nozzle being disposed adjacent the soil-discharging means whereby to produce a cavity in the soil prior to the introduction of the plant elements thereinto.

8. Plant potting apparatus according to claim 1, provided with means arranged to deposite plant elements into the pots, such depositing means being actuated by the driving means in timed relation to the pot movements.

9. An apparatus for potting plant seeds and seedlings, comprising a conveyer mechanism having a series of cups each of which is adapted to receive and temporarily hold a plant-receiving pot; driving means connected to said conveyer whereby to serially move the cups and pots to a plurality of successive positions; means at one of said positions arranged to supply soil to the successive pots; means at another of said positions arranged to supply water to the successive pots; and connections between said driving means and said soil- and water-supply means arranged to actuate such supply means concurrently when the pots are disposed at the respective positions.

10. Plant potting apparatus according to claim 9, wherein means are provided at another of said positions for producing a cavity in the soil in the pots, and such cavity-producing means are actuated by the driving means concurrently with the actuation of the soil- and water-supply means.

11. Plant potting apparatus according to claim 9, wherein means are provided at another of said positions for introducing plant elements into the pots, and such means are actuated by the driving means concurrently with the actuation of the soil- and water-supply means.

12. Plant potting apparatus according to claim 9, wherein the soil-supply means is arranged to deposit soil in the pots at two spaced positions assumed by the latter.

13. An apparatus for potting plant seeds and seedlings, comprising an endless conveyer mechanism including a series of cups each of which is adapted to receive and temporarily hold a plant receiving pot; drive means for said conveyer, including an intermittent-motion device whereby the cups and pots are advanced step-by-step to a succession of spaced positions; means at one of said positions for supplying soil to the pots when they are disposed thereat, such means including a soil-measuring valve; means at another of said positions for supplying water to the pots when they are disposed thereat, such means including a control valve; means at another of said positions for producing a cavity in the soil in the pots; and actuating connections between said conveyer drive means and said soil-measuring valve, said water-control valve, and said cavity-producing means, such connections including an intermittent-motion device operable in timed relation to the first mentioned intermittent-motion device, whereby the soil-measuring and water-control valves and the cavity-producing means are simultaneously operated at their respective positions while the pots are stationary thereat.

References Cited in the file of this patent

FOREIGN PATENTS 599,962    Great Britain _____ Mar. 24, 1948